United States Patent [19]  [11] 4,276,274
Heckel  [45] Jun. 30, 1981

[54] PROCESS FOR THE PRODUCTION OF FINELY DIVIDED OXIDES OF METALS OR SILICON

[75] Inventor: Emil Heckel, Kalmthout, Belgium

[73] Assignee: Degussa AG, Frankfurt am Main, Fed. Rep. of Germany

[21] Appl. No.: 708,776

[22] Filed: Jul. 26, 1976

[30] Foreign Application Priority Data

Jul. 30, 1975 [DE] Fed. Rep. of Germany ....... 2533925

[51] Int. Cl.$^3$ ..................... C01B 33/18; C01G 23/06; C01F 7/02
[52] U.S. Cl. ................... 423/336; 423/337; 423/487; 423/611; 423/625
[58] Field of Search ................ 204/157.1 R; 423/241, 423/336, 337, 608, 611, 612, 613, 625, 487, 633

[56] References Cited

U.S. PATENT DOCUMENTS

| | | | |
|---|---|---|---|
| 779,998 | 1/1905 | Gibbs | 423/487 |
| 1,365,740 | 1/1921 | Snelling | 423/487 X |
| 3,078,148 | 2/1963 | Belknap et al. | 423/613 |
| 3,201,337 | 8/1965 | Eichelberger et al. | 204/157.1 R |
| 3,954,945 | 5/1976 | Lange et al. | 423/337 X |

FOREIGN PATENT DOCUMENTS

| | | | |
|---|---|---|---|
| 1121279 | 7/1968 | United Kingdom | 423/337 |
| 1141134 | 1/1969 | United Kingdom | 423/241 |
| 247235 | 1/1967 | U.S.S.R. | 423/241 |

*Primary Examiner*—Jack Cooper
*Attorney, Agent, or Firm*—Beveridge, DeGrandi, Kline & Lunsford

[57] ABSTRACT

In an improved process for the production of a finely divided oxide of a metal, silicon or mixtures thereof by the hydrolytic conversion of a corresponding volatile chloride of said metal, silicon or mixtures thereof in a flame; wherein said volatile chloride or said mixture of volatile chlorides in admixture with a combustible hydrogen-containing gas and air or oxygen are fed to a flame emitting from a burner into a reaction chamber to thereby form an oxide aerosol in waste gases from said burner; cooling said oxide and said waste gases; and separating said oxide from said waste gases; wherein the improvement comprises maintaining said waste gases substantially free of chlorine by reducing chlorine that forms during said conversion in said flame with hydrogen while cooling said waste gas below the temperature at which hydrogen and oxygen react in said waste gas.

5 Claims, No Drawings

PROCESS FOR THE PRODUCTION OF FINELY DIVIDED OXIDES OF METALS OR SILICON

BACKGROUND OF THE INVENTION

1. Field of the Invention

This invention relates to a process for the production of pulverized oxides of metals, such as oxides of aluminum, titanium or silicon, by the hydrolytic conversion of a corresponding volatile halide in a flame. More particularly, this invention relates to a method of keeping the processing gas in such a hydrolytic conversion operation substantially free of chlorine gas.

2. Description of the Prior Art

According to known processes, powdered oxides can be produced by the hydrolytic combustion of volatile metal halides. This is carried out by feeding the volatile compounds together with steam-forming gases and air or oxygen, separately or in admixture, to a burner. In this case, the air or oxygen and hydrogen are mixed in a quantitative ratio such that both a complete combustion of the hydrogen as well as a hydrolysis of the halide will be assured. For the production of particularly active products, the flame temperature is controlled by the addition of a stoichiometric excess of air and oxygen or of inert gases, such as nitrogen.

The oxides are obtained in a hydrogen halide-containing exhaust gas, which is separated from the oxide particles in a separator. The hydrolysis of the halide takes place, for example, in case of use of $SiCl_4$, according to the following equation:

$$SiCl_4 + 2H_2 + O_2 \rightarrow SiO_2 + 4HCl.$$

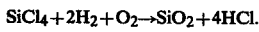

Free halogen develops in a secondary reaction by partial oxidation of HCl with excess $O_2$. This secondary reaction can be represented as follows:

$$4HCl + O_2 \rightarrow 2Cl_2 + 2H_2O.$$

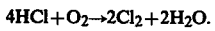

Depending upon the manner in which the flame reaction is conducted, the exhaust gas contains 6–10 weight percent free chlorine, related to the amount of the HCl.

The chlorine which per force is obtained as a secondary product must be removed by additional technical expenditure after absorption of the hydrogen chloride from the operating gas. This is accomplished according to known processes.

Because of the high costs of these processes, attempts have been made to control the formation of chlorine during the pyrolytic conversion. Thus, it is known from German Pat. No. 1 210 421 that the formation of free chlorine can be avoided by carrying out the pyrolysis in the presence of an inert gas, instead of in the presence of secondary air. For example, nitrogen can be employed. The process operates with a so-called autarchic flame, i.e., the flame already contains all components homogeneously mixed, which are necessary for the reaction.

It is also known from German Pat. No. 1 244 125, which discloses an extension of the aforementioned process, to branch off a part of the exhaust gas of the reaction after precipitation of the solid substance and to introduce it, instead of the so-called secondary air, in doses into a closed combustion chamber.

According to this known process, to be sure, the formation of free chlorine can be largely prevented, but the conversion can be carried out only by burning the flame in an inert gas atmosphere or in a closed combustion chamber.

In another known process (German published application No. 2 153 671) the formation of free halogen is prevented by "wrapping" the flame in a steam jacket, which is produced either by atomization of steam or by deflagrating a large $H_2$ excess. In the latter case, admixture of nitrogen is required in order to achieve product qualities corresponding to those obtained with a standard, open operating method.

This means that, since there is an objectionable interference with the course of the reaction by manipulation of the flame (in the reaction chamber), one must take additional measures in order to achieve the customary product qualities.

Therefore, there exists a need in the art for a method of substantially eliminating free chlorine gas from the waste gas from the hydrolytic conversion of volatile halides in a flame without interfering with the operation of the flame.

SUMMARY OF THE INVENTION

Accordingly, this invention aids in fulfilling this need in the art by providing an improved process for the production of a finely divided oxide of at least one metal, silicon, or mixtures thereof by the hydrolytic conversion of a corresponding volatile chloride of said at least one metal, silicon or mixtures thereof in a flame. The volatile chloride or a mixture of volatile chlorides in admixture with a combustible hydrogen-containing gas and air or oxygen are fed to a flame emitting from a burner into a reaction chamber to thereby form an oxide aerosol in waste gases from the burner. The oxide and waste gases are cooled in a cooling zone, and the oxide is separated from the waste gases. The improvement comprises maintaining the waste gases substantially free of chlorine by reducing chlorine that forms during the conversion in the flame with hydrogen while cooling the waste gas below the temperature at which hydrogen and oxygen react in the waste gas. Typical of the oxides are the oxides of aluminum, titanium and silicon.

The essence of this invention is to be seen in the fact that any chlorine that is formed is reduced with hydrogen during cooling down to below the temperature at which hydrogen and oxygen contained in the waste gas will react.

This can be achieved by single or multiple introduction of hydrogen into the hot waste gas having a temperature of about 500° to 700° C., which is a temperature which is passed through anyway during cooling off of the reaction products. During introduction of the hydrogen, care is taken to assure a thorough intermixing. This can be accomplished with known means, for example, by incorporating a molded body, such as a nozzle. The amount of hydrogen in relation to chlorine is typically about 2.5:1 mole.

In another variation of the process of this invention, prior to or after precipitation of the solid reaction products, the chlorine, but not the oxygen which is present at the same time in the waste gas, is made to react with hydrogen using high energy light or catalysts. For example, ultraviolet light within the range of 200–600 m$\mu$, preferably 250 to 350 m$\mu$, can be employed. Typical catalysts are quartz, magnesium or calcium chloride.

The hydrogen chloride formed during this reaction can be absorbed together with the hydrogen chloride formed during the flame hydrolysis in accordance with known processes and is obtained as a concentrated hydrochloric acid. Typically, a cyclone separator or electrostatic precipitator can be employed to separate the oxide particles from the waste gas. The particle size of the oxide particles ranges from about 5 m$\mu$ to about 40 m$\mu$.

Beside the advantage of this new process, according to which the flame reaction can run its course undisturbed, higher profitability is also achieved. As described in the Example hereinafter, no additional nitrogen or steam is required, and beyond that only small quantities of additional hydrogen are needed. Furthermore, the capacity of the installations of the standard method of operation is preserved, since the apparatus does not need to be acted upon by any additional ballast of gas, as is the case in the known processes.

This invention will be described in greater detail in the following Example.

EXAMPLE 2000 kg SiCl$_4$, 648 Nm$^3$/h of hydrogen and 1,900 Nm$^3$/h of air are fed to an AEROSOL burner, as well as 22 Nm$^3$/h of hydrogen by way of a jacket in order to keep the mouth of the burner free (referred to herein as "standard" operating method). 705 kg/h of powdered silicic acid with a specific surface of 200 m$^2$/g are obtained. 7.5% of the hydrogen chloride to be expected is found in the waste gases as free chlorine.

70 Nm$^3$/h of hydrogen are introduced into the waste gas cooled down to 510° C. The quantity of free chlorine, as a result, is reduced to 0.07%, related to the amount of hydrogen chloride.

The process parameters for the standard operating method of the known process according to the German published application No. 2 153 671 (corresponding to U.S. Pat. No. 3,954,945) as well as for the execution according to this invention are summarized in the following Table. One can see that it is possible to operate according to the process of this invention with a very small expenditure of substances.

Analogously, the production of powdered oxides of aluminum or titanium, as well as their mixed oxides with silicon dioxide, takes place by the conversion of chlorides of aluminum or titanium.

TABLE

| | HYDROGEN REQUIREMENT FOR CHLORINE-FREE PROCESSES (100% H$_2$) | | | | |
|---|---|---|---|---|---|
| | Nm$^3$/h | | | | |
| Process for the production of powdered silicon dioxide | hydrogen in the combustion gas mixture | Jacket-H$_2$ for keeping the burner mouth free | Additive hydrogen | Total Hydrogen | Nitrogen |
| Standard Process (Ger.Patent 974 793 U.S. Pat. No. 2,990,249 U.S. Pat. No. 3,086,851 U.S. Pat. No. 3,006,738 | 648 | 22 | — | 670 | — |
| Process free of Chlorine (German Published Application 2 153 671) | 849 | 54 | — | 903 | 718 |
| Process free of chlorine (according to the invention) | 648 | 22 | 70 | 740 | — |

The entire disclosure of each of the following references is relied upon and incorporated herein by reference: German Pat. No. 974 793; U.S. Pat. No. 2,990,249; U.S. Pat. No. 3,086,851. U.S. Pat. No. 3,006,738; U.S. Pat. No. 3,954,945; and German Published Application No. 2 153 671.

What is claimed is:

1. In an improved process for the production of a finely divided oxide of Ti, Al, Si or mixtures thereof by the hydrolytic conversion of a corresponding volatile chloride of Ti, Al, Si or mixtures thereof in a flame; wherein said volatile chloride or said mixture of volatile chlorides in admixture with a combustible hydrogen-containing gas and air or oxygen are fed to a flame emitting from a burner into a reaction chamber to thereby form an oxide aerosol in waste gases from said burner; cooling said oxide and said waste gases; and separating said oxide from said waste gases; wherein the improvement comprises maintaining said waste gases substantially free of chlorine by reducing chlorine that forms during said conversion in said flame with hydrogen by single or multiple introduction of said hydrogen into the waste gas which is at a temperature of about 500° C. to 700° C. and while cooling said waste gas below the temperature at which hydrogen and oxygen react in said waste gas.

2. Process according to claim 1 in which the hydrogen for the reduction of the chlorine is introduced with substantially complete intermixing of the waste gases.

3. Process according to claim 2 in which the intermixing of the waste gases is accomplished in the cooling system by means of nozzles.

4. Process according to claim 2 in which said intermixing is achieved by spraying said hydrogen through a nozzle into said waste gas.

5. Process according to claim 1 wherein said oxides have a particle size of about 5 to about 40 m$\mu$.

* * * * *